United States Patent Office 3,290,297
Patented Dec. 6, 1966

3,290,297
TETRAHYDROFURANYL ETHERS OF
$\Delta^{1,3,5(10)}$-ESTRATRIENE
Alexander D. Cross, Mexico City, Mexico, assignor to Syntex Corporation, Panama, Panama, a corporation of Panama
No Drawing. Filed Feb. 11, 1965, Ser. No. 432,015
20 Claims. (Cl. 260—239.55)

This invention relates to novel cyclopentanopolyhydrophenanthrene derivatives and to processes for the preparation thereof.

More particularly, this invention relates to novel 3-tetrahydrofuranyl, 17-tetrahydrofuranyl and 3,17-bis(tetrahydrofuranyl)ethers of $\Delta^{1,3,5(10)}$-estratriene derivatives, all represented by the general formula:

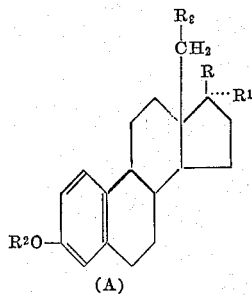

(A)

In this formula R represents a hydroxyl group, an acyloxy group or a tetrahydrofuranyloxy group, $R^1$ represents hydrogen, a lower alkyl group, such as methyl, ethyl, propyl and the like, a lower alkenyl group, such as vinyl and the like, or a lower alkynyl (including halo-lower alkynyl wherein the halogen has an atomic number less than 53, i.e., fluoro, chloro or bromo) group, such as ethynyl, fluoroethynyl, chloroethynyl, bromoethynyl, propynyl, trifluoropropynyl, butnyl, hexynyl, and the like, R and $R^1$ taken together represent a keto group, $R^2$ represents hydrogen, an acyl group, a hydrocarbon group, including alkyl, aryl, alkaryl and aralkyl groups, containing from 1 to 8 carbon atoms, inclusive, such as methyl, phenyl, benzyl, phenylethyl, and the like, or a tetrahydrofuranyl group, with at least one of R and $OR^2$ being a tetrahydrofuranyloxy group, and $R^3$ represents hydrogen or a lower alkyl group.

The acyl and acyloxy groups referred to herein are preferably derived from hydrocarbon carboxylic acids containing less than 12 carbon atoms which may be saturated or unsaturated, of straight, branched, cyclic or cylic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel 3-tetrahydrofuranyl, 17-tetrahydrofuranyl and 3,17-bis(tetrahydrofuranyl)ethers represented by formula A hereinabove exhibit enhanced estrogenic activity when administered orally, and are useful in fertility control.

The novel 3-tetrahydrofuranyl and 3,17-bis(tetrahydrofuranyl)ethers of the present invention can be prepared from estrone and 18-alkylated derivatives thereof by a process which can be illustrated schematically as follows:

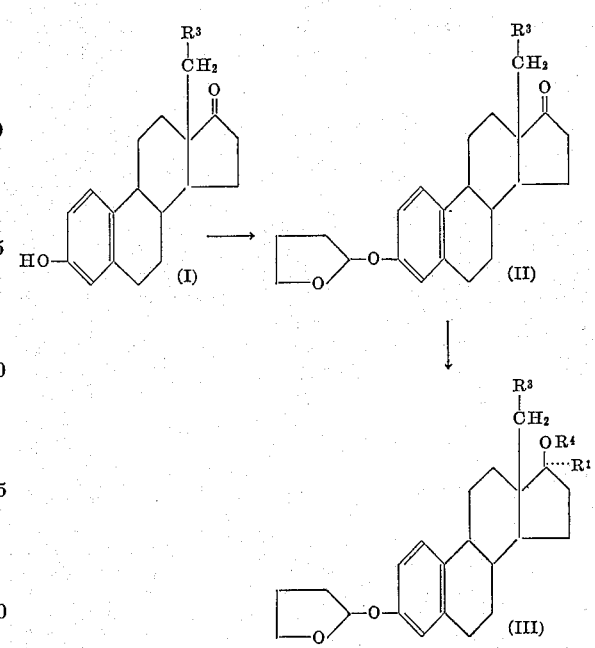

In these formulas $R^1$ and $R^3$ have the same meaning as set forth hereinabove for formula A and $R^4$ represents hydrogen or a tetrahydrofuranyl group.

In carrying out the above-illustrated process, estrone (I: $R^3$=hydrogen) or an 18-lower alkyl derivative thereof [obtainable, as are the corresponding 18-lower alkyl-$\Delta^{1,3,5(10)}$-estratriene-3,17β-diols, by the method described by Smith et al. in Experientia, vol. 19, pages 394–396 (1963)], e.g., 18-methylestrone (I: $R^3$=methyl) is reacted under substantially anhydrous conditions with an excess of dihydrofuran (prepared as described in U.S. Patent No. 2,556,325 to M. L. A. Fluchaire and G. Collardeau), e.g., from about 1 to about 2 or more molecular equivalents for each hydroxyl group in the steroid starting material, in the presence of a small amount of an acidic catalyst, e.g., hydrochloric acid, p-toluenesulfonic acid, boron trifluoride etherate, and the like, either alone or together with an inert organic solvent such as benzene, diethyl ether, or the like, at a temperature ranging from about 0° C. to about 80° C., and preferably at room temperature (about 25° C.) for from about 5 minutes to about 48 hours, thus giving the corresponding 3-tetrahydrofuranyl ether II, e.g., 3-tetrahydrofuranyloxy-$\Delta^{1,3,5(10)}$-estratrien-17-one (estrone 3-tetrahydrofuranyl ether, $R^3$=hydrogen).

The thus-obtained 3-tetrahydrofuranyl ether is then converted to the corresponding 17α-unsubstituted-17β-hydroxy derivative (III: $R^1$ and $R^4$=hydrogen) or to the corresponding 17α-lower alkyl, alkenyl or alkynyl-17β-hydroxy derivative (III: $R^1$=lower alkyl, alkenyl or alkynyl, $R^4$=hydrogen) by conventional methods.

When the 17α-unsubstituted derivatives are desired, the 3-tetrahydrofuranyloxy-17-one (II) can be dissolved in an inert organic solvent, e.g., a lower alkanol such as methanol, an ether such as dioxane or tetrahydrofuran, or the like, and reacted under neutral conditions with a metal hydride, e.g., lithium aluminum hydride, sodium borohydride, and the like, at a temperature ranging from room temperature to reflux temperature for from about 1 hour to about 24 hours, thus giving the corresponding 17α-unsubstituted-17β-ol (III), e.g., 3-tetrahydrofuranyloxy-$\Delta^{1,3,5(10)}$-estratrien-17β-ol(estradiol 3 - tetrahydrofuranyl ether, $R^1$, $R^3$ and $R^4$=hydrogen).

When the 17α-lower alkyl, alkenyl or alkynyl derivatives are desired, the 3-tetrahydrofuranyloxy-17-one (II) can be refluxed in thiophene-free benzene, under substantially anhydrous conditions, with a lower alkyl, alkenyl or alkynyl magnesium halide, such as methyl, vinyl or ethynyl magnesium bromide, or the like, for about 3 hours or longer, thus giving the corresponding 17α-lower alkyl, alkenyl or alkynyl-17β-ol (III), e.g., 3-tetrahydrofuranyloxy-17α-methyl - $\Delta^{1,3,5(10)}$-estratrien-17β-ol (III; $R^1$=methyl, $R^3$ and $R^4$=hydrogen).

Similarly, the 3-tetrahydrofuranyloxy-17-one (II), dissolved in absolute diethyl ether, can be reacted under an inert nitrogen atmosphere with a lower alkyl, alkenyl or alkynyl lithium compound, such as ethyl lithium, vinyl lithium, ethynyl lithium, or the like, for 48 hours or longer at room temperature to provide the corresponding 17α-lower alkyl, alkenyl or alkynyl-17β-ol (III).

The 3-tetrahydrofuranyloxy-17-one (II) can also be dissolved in anhydrous benzene containing potassium t-amylate and reacted under an inert nitrogen atmosphere with gaseous acetylene at room temperature for 40 hours or longer to give the corresponding 17α-ethynyl-17β-ol (III), which can then be hydrogenated in known manner to give the corresponding 17α-vinyl or 17α-ethyl derivatives.

Where the 17α-monohaloalkynyl-17β-hydroxy derivatives are desired, a 1,2-dihaloethylene wherein at least one of the halogens is other than fluorine, e.g., 1-chloro-2-fluoroethylene, 1,2-dichloroethylene or 1,2-dibromoethylene, dissolved in anhydrous diethyl ether, is slowly admixed at 0° C., under an inert nitrogen atmosphere, with a solution of methyl lithium in anhydrous diethyl ether (prepared, for example, by adding lithium to methyl iodide in anhydrous diethyl ether solution under an inert nitrogen atmosphere at about 10° C.). This mixture is then held at room temperature, with stirring, for from about 90 minutes to about 12 hours, following which the steroid starting material, e.g., estrone 3-tetrahydrofuranyl ether (II; $R^3$=hydrogen), is slowly added and the resulting reaction mixture is held at room temperature for from about 12 hours to about 18 hours to give the corresponding 17α-haloethynyl-17β-ol (III). Where 1-chloro-2-fluoroethylene is used, a 17α-fluoroethynyl substituent is obtained; 1,2-dichloroethylene gives a 17α-chloroethynyl substituent, and 1,2-dibromoethylene gives a 17α-bromo-ethynyl substituent.

A 17α-trifluoropropynyl substituent can be introduced by reacting the 3-tetrahydrofuranyloxy-17-one (II) with trifluoropropynylmagnesium bromide (prepared by reacting trifluoromethyl acetylene with ethylmagnesium bromide under standard Grignard conditions) in an inert organic solvent, preferably a mixture of diethyl ether and tetrahydrofuran, under substantially anhydrous conditions at room temperature for from about 16 to about 24 hours or longer.

Each of the thus-obtained 17α-unsubstituted-17β-ols and 17α-lower alkyl, alkenyl or alkynyl-17β-ols, when reacted with an excess of dihydrofuran in the manner described hereinabove, gives the corresponding 3,17-bis(tetrahydrofuranyl)ether (III), e.g., 3,17-bis(tetrahydrofuranyl - 17α - methyl - $\Delta^{1,3,5(10)}$ - estratriene (III; $R^1$=methyl, $R^3$=hydrogen, $R^4$=tetrahydrofuranyl).

The novel 3-tetrahydrofuranyl, 17-tetrahydrofuranyl and 3,17-bis(tetrahydrofuranyl)ethers of the present invention can also be prepared from estradiol and derivatives thereof by processes which can be illustrated schematically as follows:

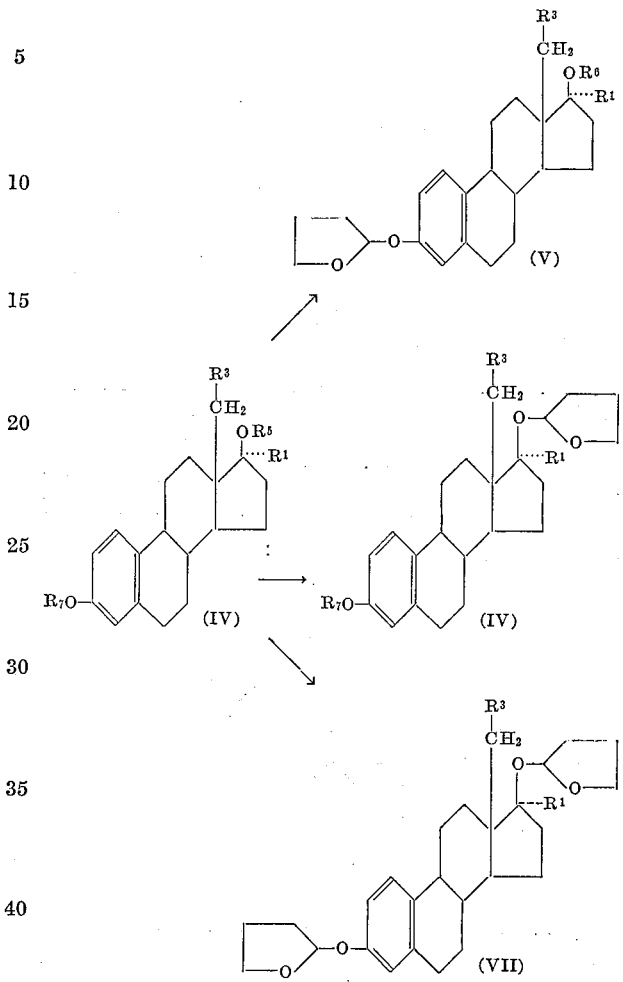

In these formulas $R^1$, $R^2$ and $R^3$ have the same meanings as set forth hereinabove for formula A, $R^5$ represents hydrogen, an acyl group or a tetrahydrofuranyl group, with at least one $R^2$ and $R^5$ being hydrogen, $R^6$ represents hydrogen or an acyl group, and $R^7$ represents hydrogen, an acyl group or a hydrocarbon group of the type referred to hereinabove containing from 1 to 8 carbon atoms, inclusive.

In the first of these processes (IV→V), the starting material IV which is a 3-hydroxy-17β-acyloxy-$\Delta^{1,3,5(10)}$-estratriene, e.g., estradiol 17-acetate (IV; $R^1$, $R^2$ and $R^3$= hydrogen, $R^5$= acetyl), is converted to the corresponding 3-tetrahydrofuranyloxy-17β-acyloxy-$\Delta^{1,3,5(10)}$ - estratriene (V), e.g., estradiol 3-tetrahydrofuranyl ether 17-acetate (V; $R^1$ and $R^3$=hydrogen, $R^6$=acetyl) by reaction with an excess of dihydrofuran in the manner described hereinabove.

In the second of these processes (IV→VI) the starting material IV which is a 3-acyloxy or 3-hydrocarbonoxy-17β-hydroxy-$\Delta^{1,3,5(10)}$-estratriene, e.g., estradiol 3-acetate (IV: $R^1$, $R^3$ and $R^5$=hydrogen, $R^2$=acetyl) or estradiol 3-methyl ether (IV; $R^1$, $R^3$ and $R^5$= hydrogen; $R^2$= methyl), is converted to the corresponding 3-acyloxy or 3-hydrocarbonoxy - 17β - tetrahydrofuranyloxy - $\Delta^{1,3,5(10)}$-estratriene VI, e.g., estradiol 3-acetate 17-tetrahydrofuranyl ether (VI: $R^1$ and $R^3$=hydrogen; $R^7$=acetyl) or estradiol 3-methyl ether 17-tetrahydrofuranyl ether (VI: $R^1$ and $R^3$= hydrogen; $R^7$=methyl) by reaction with an excess of dihydrofuran in the manner described hereinabove.

The 3-tetrahydrofuranyloxy-17β-acyloxy steroids prepared in step IV→V hereinabove and the 3-acyloxy-17β- tetrahydrofuranyloxy steroids prepared in step IV→VI hereinabove can be converted to the corresponding free 17β- or 3-ols by conventional hydrolysis techniques. Thus, for example, they can be dissolved in a mixture of water and methanol containing from about 0.02 gram to about 1 gram of sodium hydroxide, potassium hydroxide, or the like, per gram of starting steroid, and reacted at a temperature of from about 0° C. to about 50° C. for from about 10 minutes to about 6 hours to selectively hydrolyze the 3- or 17-acyloxy group, leaving the tetrahydrofuranyloxy group intact.

In the third of these processes (IV→VII), the starting material IV can be a 3,17β-dihydroxy-$\Delta^{1,3,5(10)}$-estratriene, e.g., estradiol itself (IV: $R^1$, $R^2$, $R^3$ and $R^5$=hydrogen), a 3 - tetrahydrofuranyloxy - 17 β -hydroxy-$\Delta^{1,3,5(10)}$-estratriene, e.g., estradiol 3-tetrahydrofuranyl ether (IV: $R^1$, $R^3$ and $R^5$=hydrogen; $R^2$=tetrahydrofuranyl), prepared as described in either step II→III or IV→V hereinabove, or a 3-hydroxy-17β-tetrahyahydrofuranyloxy-$\Delta^{1,3,5(10)}$-estratriene, e.g., estradiol 17-tetrahydrofuranyl ether (IV: $R^1$, $R^2$ and $R^3$=hydrogen; $R^5$=tetrahydrofuranyl), prepared as described in step IV→VI hereinabove, and it will also be converted to the corresponding 3,17 - bis(tetrahydrofuranyloxy)-$\Delta^{1,3,5(10)}$-estratriene, e.g., estradiol 3,17-bis(tetrahydrofuranyl) ether (VII: $R^1$ and $R^3$=hydrogen) by reaction with an excess of dihydrofuran in the manner described hereinabove.

An illustrative but by no means exhaustive listing of 3-tetrahydrofuranyloxy, 17-tetrahydrofuranyloxy and 3,17 - bis(tetrahydrofuranyloxy)-$\Delta^{1,3,5(10)}$-estratrienes prepared by the processes of the present invention includes:

3-tetrahydrofuranyloxy-$\Delta^{1,3,5(10)}$-estratrien-17-one,
3-tetrahydrofuranyloxy-18-methyl-$\Delta^{1,3,5(10)}$-estratrien-17-one,
3-tetrahydrofuranyloxy-18-ethyl-$\Delta^{1,3,5(10)}$-estratrien-17-one,
3-tetrahydrofuranyloxy-$\Delta^{1,3,5(10)}$-estratrien-17β-ol,3-tetrahydrofuranyloxy-$\Delta^{1,3,5(10)}$-estratriene-17β-ol 17-acetate,
3-tetrahydrofuranyloxy-$\Delta^{1,3,5(10)}$-estratrien-17β-ol-17-propionate,
3-tetrahydrofuranyloxy-17α-methyl-$\Delta^{1,3,5(10)}$-estratrien-17β-ol,
3-tetrahydrofuranyloxy-17α-vinyl-$\Delta^{1,3,5(10)}$-estratrien-17β-ol,
3-tetrahydrofuranyloxy-17α-ethynyl-$\Delta^{1,3,5(10)}$-estratrien-17β-ol,
3-tetrahydrofuranyloxy-17α-ethynyl-$\Delta^{1,3,5(10)}$-estratrien-17β-ol 17-acetate,
3-tetrahydrofuranyloxy-17α-fluoroethynyl-$\Delta^{1,3,5(10)}$-estratrien-17β-ol,
3-tetrahydrofuranyloxy-17α-chloroethynyl-$\Delta^{1,3,5(10)}$-estratrien-17β-ol,
3-tetrahydrofuranyloxy-17α-bromoethynyl-$\Delta^{1,3,5(10)}$-estratrien-17β-ol,
3-tetrahydrofuranyloxy-17α-trifluoropropynyl-$\Delta^{1,3,5(10)}$-estratrien-17β-ol,
3-tetrahydrofuranyloxy-18-methyl-$\Delta^{1,3,5(10)}$-estratrien-17β-ol,
3-tetrahydrofuranyloxy-18-methyl-$\Delta^{1,3,5(10)}$-estratrien-17β-ol 17-caproate,
3-tetrahydrofuranyloxy-18-ethyl-$\Delta^{1,3,5(10)}$-estratrien-17β-ol,
3-tetrahydrofuranyloxy-17α,18-dimethyl-$\Delta^{1,3,5(10)}$-estratrien-17β-ol,
3-tetrahydrofuranyloxy-17α-ethynyl-18-methyl-$\Delta^{1,3,5(10)}$-estratrien-17β-ol,
3-tetrahydrofuranyloxy-17α-fluoroethynyl-18-ethyl-$\Delta^{1,3,5(10)}$-estratrien-17β-ol,
17β-tetrahydrofuranyloxy-$\Delta^{1,3,5(10)}$-estratrien-3-ol,
17β-tetrahydrofuranyloxy-$\Delta^{1,3,5(10)}$-estratrien-3-ol 3-acetate,
3-methoxy-17β-tetrahydrofuranyloxy-$\Delta^{1,3,5(10)}$-estratriene,
17α-methyl-17β-tetrahydrofuranyloxy-$\Delta^{1,3,5(10)}$-estratrien-3-ol,
17α-vinyl-17β-tetrahydrofuranyloxy-$\Delta^{1,3,5(10)}$-estratrien-3-ol,
17α-ethynyl-17β-tetrahydrofuranyloxy-$\Delta^{1,3,5(10)}$-estratrien-3-ol,
17α-ethynyl-17β-tetrahydrofuranyloxy-$\Delta^{1,3,5(10)}$-estratrien-3-ol 3-acetate,
3-methoxy-17α-ethynyl-17β-tetrahydrofuranyloxy-$\Delta^{1,3,5(10)}$-estratriene,
3-benzoxy-17α-ethynyl-17β-tetrahydrofuranyloxy-$\Delta^{1,3,5(10)}$-estratriene,
17α-fluoroethynyl-17β-tetrahydrofuranyloxy-$\Delta^{1,3,5(10)}$-estratrien-3-ol,
17α-chloroethynyl-17β-tetrahydrofuranyloxy-$\Delta^{1,3,5(10)}$-estratrien-3-ol,
17α-bromoethylnyl-17β-tetrahydrofuranyloxy-$\Delta^{1,3,5(10)}$-estratrien-3-ol,
17α-trifluoropropynyl-17β-tetrahydrofuranyloxy-$\Delta^{1,3,5(10)}$-estratrien-3-ol,
17β-tetrahydrofuranyloxy-18-methyl-$\Delta^{1,3,5(10)}$-estratrien-3-ol,
17β-tetrahydrofuranyloxy-18-ethyl-$\Delta^{1,3,5(10)}$-estratrien-3-ol,
3-methoxy-17β-tetrahydrofuranyloxy-18-ethyl-$\Delta^{1,3,5(10)}$-estratriene,
17α,18-dimethyl-17β-tetrahydrofuranyloxy-$\Delta^{1,3,5(10)}$-estratrien-3-ol,
17α-methyl-17β-tetrahydrofuranyloxy-18-ethyl-$\Delta^{1,3,5(10)}$-estratrien-3-ol,
17α-ethynyl-17β-tetrahydrofuranyloxy-18-ethyl-$\Delta^{1,3,5(10)}$-estratrien-3-ol,
17α-ethynyl-17β-tetrahydrofuranyloxy-18-ethyl-$\Delta^{1,3,5(10)}$-estratrien-3-ol 3-benzoate,
3,17-bis(tetrahydrofuranyloxy)-$\Delta^{1,3,5(10)}$-estratriene,
3,17-bis(tetrahydrofuranyloxy-17α-methyl-$\Delta^{1,3,5(10)}$-estratriene,
3,17-bis(tetrahydrofuranyloxy)-17α-vinyl-$\Delta^{1,3,5(10)}$-estratriene,
3,17-bis(tetrahydrofuranyloxy-17α-ethynyl-$\Delta^{1,3,5(10)}$-estratriene,
3,17-bis(tetrahydrofuranyloxy)-17α-fluoroethynyl-$\Delta^{1,3,5(10)}$-estratriene,
3,17-bis(tetrahydrofuranyloxy)-17α-chloroethynyl-$\Delta^{1,3,5(10)}$-estratriene,
3,17-bis(tetrahydrofuranyloxy)-17α-bromoethynyl-$\Delta^{1,3,5(10)}$-estratriene,
3,17-bis(tetrahydrofuranyloxy)-17α-trifluoropropynyl-$\Delta^{1,3,5(10)}$-estratriene,
3,17-bis(tetrahydrofuranyloxy)-18-methyl-$\Delta^{1,3,5(10)}$-estratriene,
3,17-bis(tetrahydrofuranyloxy)-18-ethyl-$\Delta^{1,3,5(10)}$-estratriene,
3,17-bis(tetrahydrofuranyloxy)-17α,18-dimethyl-$\Delta^{1,3,5(10)}$-estratriene,
3,17-bis(tetrahydrofuranyloxy)-17α-methyl-18-ethyl-$\Delta^{1,3,5(10)}$-estratriene,
3,17-bis(tetrahydrofuranyloxy)-17α-ethynyl-18-methyl-$\Delta^{1,3,5(10)}$-estratriene,
3,17-bis(tetrahydrofuranyloxy)-17α-ethynyl-18-ethyl-$\Delta^{1,3,5(10)}$-estratriene,
3,17-bis(tetrahydrofuranyloxy)-17α-trifluoropropynyl-18-methyl-$\Delta^{1,3,5(10)}$-estratriene, and the like.

In order that those skilled in the art can more fully understand the present invention, the following examples are set forth. These examples are given solely for the purpose of illustrating the invention, and should not be considered as expressing limitations unless so set forth in the appended claims.

PREPARATION A

A solution of 5 grams of 18-methylestrone in 250 cc. of anhydrous, thiophene-free benzene was admixed with 27.5 cc. of a 4 N solution of methylmagnesium bromide in anhydrous diethyl ether, and the resulting reaction mixture was refluxed, excluding moisture, for 3 hours. Following this reaction period the reaction mixture was cooled to room temperature, cautiously treated with an excess of an aqueous ammonium chloride solution, and then extracted with ethyl acetate. The thus-obtained extract was washed with water, dried over anhydrous sodium sulfate and evaporated to dryness. Crystallization of the resulting residue from methylene dichloridehexane gave 17α,18-dimethylestradiol.

By repeating this procedure using 18-ethylestrone, 17α-methyl-18-ethylestradiol was obtained.

PREPARATION B

A solution of 1 gram of 18-methylestrone in 30 cc. of anhydrous benzene was added to a solution prepared by dissolving 1.4 grams of potassium in 30 cc. of t-amyl alcohol, contained under an inert nitrogen atmosphere. Next, a slow current of purified acetylene was passed through the solution for 40 hours. Following this reaction period the reaction mixture was diluted with water and then extracted with benzene. The thus-obtained organic extract was washed with water until neutral, then dried over anhydrous sodium sulfate and evaporated to dryness. Chromatography of the thus-obtained residue on alkaline alumina gave, in the hexane-benzene (2:3, respectively, by volume) fractions, a product which, upon recrystallization from acetone-hexane, yielded 17α-ethynyl-18-methylestradiol.

By repeating this procedure using 18-ethylestrone, 17α-ethynyl-18-ethylestradiol was obtained.

PREPARATION C

A solution of 1 gram of 17α-ethynyl-18-methylestradiol in 40 cc. of pyridine was hydrogenated at room temperature and atmospheric pressure in the presence of 400 mg. of pre-hydrogenated 2% palladium-on-calcium carbonate hydrogenation catalyst, with the reaction being continued until 1.1 molar equivalents of hydrogen had been absorbed. At this point, the reaction was stopped by removal of the catalyst by filtration through Celite. The catalyst was then washed with ethyl acetate and these washings were added to the filtrate. The combined solution was then evaporated to dryness under reduced pressure and the resulting crude product was dissolved in ethyl acetate. This solution was washed with dilute hydrochloric acid and then with water until neutral, then dried over anhydrous sodium sulfate and evaporated to dryness. Recrystallization from acetone gave 17α-vinyl-18-methylestradiol.

By repeating this procedure using 17α-ethynyl-18-ethylestradiol, 17α-vinyl-18-ethylestradiol was obtained.

PREPARATION D

A mixture of 1 gram of 18-methylestrone in 4 cc. of pyridine and 2 cc. of acetic anhydride was allowed to stand at room temperature overnight. Following this reaction period the reaction mixture was poured into ice water and the resulting precipitate was collected by filtration, washed with water and dried. Recrystallization from acetone-hexane gave 18-methylestrone 3-acetate.

This procedure was then repeated in every detail but one, namely, 18-methylestrone was replaced by 18-ethylestrone,
17α,18-dimethylestradiol,
17α-vinyl-18-methylestradiol,
17α-ethynyl-18-methylestradiol,
17α-methyl-18-ethylestradiol,
17α-vinyl-18-ethylestradiol and
17α-ethynyl-18-ethylestradiol, respectively.

In each case, the corresponding 3-acetate, namely,
18-ethylestrone 3-acetate,
17α,18-dimethylestradiol 3-acetate,
17α-vinyl-18-methylestradiol 3-acetate,
17α-ethynyl-18-methylestradiol 3-acetate,
17α-methyl-18-ethylestradiol 3-acetate,
17α-vinyl-18-ethylestradiol 3-acetate, and
17α-ethynyl-18-ethylestradiol 3-acetate, respectively, was obtained.

PREPARATION E 20 cc. of dimethyl sulfate and a solution of 80 grams of potassium hydroxide in 50 cc. of water were added alternatively, in 5 cc. portions over a 30 minute period, to a boiling solution of 5 grams of 18-methylestrone in 500 cc. of ethanol, with boiling being continued during the addition. Following this addition, the resulting reaction mixture was boiled for an additional 45 minutes, after which it was cooled to room temperature, poured into ice water and neutralized with hydrochloric acid. The thus-formed precipitate was collected by filtration, washed with water and dried. Crystallization from chloroform-hexane then gave 18-methylestrone 3-methyl ether.

By repeating this procedure using the remaining free 3-ol starting materials described in Preparation D hereinabove, the corresponding 3-methyl ethers, namely, 18-ethylestrone 3-methyl ether, 17α,18-dimethylestradiol 3-methyl ether, 17α-vinyl-18-methylestradiol 3-methyl ether, 17α-ethynyl-18-methylestradiol 3-methyl ether, 17α-methyl-18-ethylestradiol-3-methyl-ether, 17α-vinyl-18-ethylestradiol 3-methyl ether, and 17α-ethynyl-18-ethylestradiol 3-methyl ether, respectively, were obtained.

PREPARATION F

A solution of 8.5 grams of 1-chloro-2-fluoroethylene in 50 cc. of anhydrous diethyl ether was added dropwise over a half hour period at 0° C., with stirring, to 15 cc. of a 1.4 N solution of methyl lithium in anhydrous diethyl ether, contained under an inert nitrogen atmosphere, and this mixture was then held at room temperature, with stirring, for an additional 90 minutes. Next, a solution of 0.5 gram of estrone 3-methyl ether in 20 cc. of anhydrous diethyl ether was added dropwise, with stirring, over a 15 minute period, following which the resulting reaction mixture was held at room temperature, with stirring, overnight. Following this reaction period the reaction mixture was poured into water and extracted with diethyl ether. The combined ether extracts were then washed with water, dried over anhydrous sodium sulfate and concentrated under vacuum. Chromatography of the resulting residue on basic alumina, using petroleum ether-diethyl ether (8:2, respectively, by volume) as the eluant, followed by crystallization from acid-free methanol, gave 17α-fluoroethynyl-estradiol 3-methyl ether.

By repeating this procedure in every detail but one, namely, replacing 1-chloro-2-fluoroethylene with 1,2-dichloroethylene and 1,2-dibromoethylene, respectively, 17α-chloroethynylestradiol 3-methyl ether and 17α-bromoethynylestradiol 3-methyl ether, respectively, were obtained.

Similarly, by replacing estrone 3-methyl ether with estrone 3-acetate, 18-methylestrone 3-methyl ether, 18-methylestrone 3-acetate, 18-ethylestrone 3-methyl ether and 18-ethylestrone 3-acetate, respectively, and using the above-named 1,2-dihaloethylene reagents, the corresponding 17α-haloethynyl-17β-hydroxy derivatives, namely, 17α-fluoroethynylestradiol 3-acetate,
17α-chloroethynylestradiol 3-acetate,
17α-bromoethynylestradiol 3-acetate,
17α-fluoroethynyl-18-methylestradiol 3-methyl ether,
17α-chloroethynyl-18-methylestradiol 3-methyl ether,
17α-bromoethynyl-18-methylestradiol 3-methyl ether,
17α-fluoroethynyl-18-methylestradiol 3-acetate,
17α-chloroethynyl-18-methylestradiol 3-acetate,
17α-bromoethynyl-18-methylestradiol 3-acetate,
17α-fluoroethynyl-18-ethylestradiol 3-methyl ether,
17α-chloroethynyl-18-ethylestradiol 3-methyl ether,
17α-bromoethynyl-18-ethylestradiol 3-methyl ether,
17α-fluoroethynyl-18-ethylestradiol 3-acetate, 17α-chloroethynyl-18-ethylestradiol 3-acetate, and
17α-bromoethynyl-18-ethylestradiol 3-acetate, respectively, were obtained.

PREPARATION G

A solution of 1 gram of ethylmagnesium bromide in 50 cc. of anhydrous tetrahydrofuran was admixed with a solution of 6 grams of trifluoromethylacetylene in 200 cc. of anyhdrous diethyl ether, and the resulting mixture was allowed to stand at room temperature, with stirring, for 18 hours. Next, a solution of 1 gram of estrone 3-methyl ether in 50 cc. of anhydrous tetrahydrofuran was added, and the resulting reaction mixture was allowed to stand at room temperature, with stirring, for 18 hours. Following this reaction period the reaction period the reaction mixture was poured into a saturated ammonium chloride solution and then extracted with diethyl ether. The thus-obtained extract was then washed with water until neutral, dried over anhydrous sodium sulfate and evaporated to dryness. Recrystallization of the resulting residue from acetone-diethyl ether gave 17α-trifluoropropynylestradiol 3-methyl ether.

By repeating this procedure in every detail but one, namely, replacing estrone 3-methyl ether with estrone, 18-methylestrone, 18-methylestrone 3-methyl ether, 18-ethylestrone, and 18-ethylestrone 3-methyl ether, respectively, the corresponding 17α-trifluoropropynyl-17β-hydroxy derivatives, namely, 17α-trifluoropropynylestradiol, 17α-trifluoropropynyl-18-methylestradiol, 17α-trifluoropropynyl-18-methylestradiol 3-methyl ether, 17α-trifluoropropynyl-18-ethylestradiol, and 17α-trifluoropropynyl-18-ethylestradiol 3-methyl ether, respectively, were obtained.

PREPARATION H

17α-trifluoropropynylestradiol; 17α-trifluoropropynyl-18-methylestradiol and 17α-trifluoropropynyl-18-ethylestradiol were each esterfied with acetic anhydride in pyridine in the manner described in Preparation D hereinabove, thus giving 17α-trifluoropropynylestradiol 3-acetate, 17α-trifluoropropynyl-18-methylestradiol 3-acetate, and 17α-trifluoropropynyl-18-ethylestradiol 3-acetate.

PREPARATION I

A solution of 1 gram of 17α-fluoroethynylestradiol 3-acetate in 50 cc. of methanol was admixed with a solution of 500 mg. of potassium hydroxide dissolved in 1 cc. of water, and the resulting reaction mixture was then refluxed for 3 hours. Following this reaction period the reaction mixture was poured into ice water, and the resulting precipitate was collected by filtration, washed with water until the washings were neutral, and dried. Recrystallization from methylene dichloride-diethyl ether gave 17α-fluoroethynylestradiol.

This procedure was then repeated using the remaining 3-acetates prepared as described in Preparation F hereinabove. In each case, the corresponding free 3-ol, namely, 17α-chloroethynylestradiol, 17α-bromoethynylestradiol, 17α-fluoroethynyl-18-methylestradiol, 17α-chloroethynyl-18-methylestradiol, 17α-bromoethynyl-18-methylestradiol, 17α-fluoroethynyl-18-ethylestradiol, 17α-chloroethynyl-18-ethylestradiol, and 17α-bromoethynyl-18-ethylestradiol, respectively, was obtained.

PREPARATION J

A solution of 2 grams of sodium borohydride in 30 cc. of water was added to an ice-cold solution of 2 grams of estrone 3-acetate in 40 cc. of dioxane, and the resulting reaction mixture was allowed to stand at room temperature for 16 hours. Following this reaction period excess sodium borohydride was decomposed by the addition of an equivalent amount of acetic acid, and the solution concentrated to a small volume under vacuum and then diluted with water. Next, the product was extracted with ethyl acetate, and this extract was washed with water, dried over anhydrous sodium sulfate and evaporated to dryness. Crystallization of the resulting residue from acetone-hexane gave estradiol 3-acetate.

By repeating this procedure using 18-methylestrone 3-acetate and 18-ethylestrone 3-acetate in place of estrone 3-acetate, 18-methylestradiol 3-acetate and 18-ethylestradiol 3-acetate were obtained.

PREPARATION K

A mixture of 1 gram of 17α-methylestradiol, 1 gram of p-toluenesulfonic acid monohydrate, 50 cc. of acetic acid and 25 cc. of acetic anhydride was allowed to stand for 24 hours at room temperature. Following this reaction period the reaction mixture was poured into water and stirred until excess acetic anhydride had decomposed, following which the product was extracted with methylene dichloride. The thus-obtained extract was washed with water until neutral, dried over anhydrous sodium sulfate and evaporated to dryness. Crystallization of the resulting residue from acetone-diethyl ether gave 17α-methylestradiol 3,17-diacetate.

By repeating this procedure in every detail but one, namely, replacing 17α-methylestradiol with:

17α-vinylestradiol,
17α-ethynylestradiol,
17α-fluoroethynylestradiol,
17α-chloroethynylestradiol,
17α-bromoethynylestradiol,
17α-trifluoropropynylestradiol,
17α,18-dimethylestradiol,
17α-vinyl-18-methylestradiol,
17α-ethynyl-18-methylestradiol,
17α-fluoroethynyl-18-methylestradiol,
17α-chloroethynyl-18-methylestradiol,
17α-bromoethynyl-18-methylestradiol,
17α-trifluoropropynyl-18-methylestradiol,
17α-methyl-18-ethylestradiol,
17α-vinyl-18-ethylestradiol,
17α-ethynyl-18-ethylestradiol,
17α-fluoroethynyl-18-ethylestradiol,
17α-chloroethynyl-18-ethylestradiol,
17α-bromoethynyl-18-ethylestradiol, and
17α-trifluoropropynyl-18-ethylestradiol, respectively, the corresponding, 3,17-diacetates were obtained.

PREPARATION L

A solution of 4 grams of 17α-methylestradiol 3,17-diacetate in 60 cc. of methanol, cooled to 0° C., was admixed with 20 cc. of a 0.5% solution of methanolic potassium hydroxide which had also been cooled to 0° C., and the resulting reaction mixture was maintained at 0–5° C. for 1 hour. Following this reaction period the reaction mixture was poured into water and neutralized with dilute hydrochloric acid. Next, the product was extracted with diethyl ether and the extract, upon chromatography on ethyl acetate-washed alumina gave, in the hexane-benzene (1:3, respectively, by volume) and benzene eluates a product which was then crystallized from acetone/hexane to give 17α-methylestradiol 17-acetate.

This procedure was then repeated using the remaining 3,17-diacetates prepared as described in Preparation K hereinabove. In each case, the corresponding 17-monoacetate, namely, 17α-vinylestradiol 17-acetate,
17α-ethynylestradiol 17-acetate,
17α-fluoroethynylestradiol 17-acetate,
17α-chloroethynylestradiol 17-acetate,
17α-bromoethynylestradiol 17-acetate,
17α-trifluoropropynylestradiol 17-acetate,
17α,18-dimethylestradiol 17-acetate,
17α-vinyl-18-methylestradiol 17-acetate, 17α-ethynyl-18-methylestradiol 17-acetate,
17α-fluoroethynyl-18-methylestradiol 17-acetate,
17α-chloroethynyl-18-methylestradiol 17-acetate,
17α-bromoethynyl-18-methylestradiol 17-acetate,
17α-trifluoropropynyl-18-methylestradiol 17-acetate,
17α-methyl-18-ethylestradiol 17-acetate,
17α-vinyl-17-ethylestradiol 17-acetate,
17α-ethynyl-18-ethylestradiol 17-acetate,
17α-fluoroethynyl-18-ethylestradiol 17-acetate,
17α-chloroethynyl-18-ethylestradiol 17-acetate,
17-bromoethynyl-18-ethylestradiol 17-acetate, and
17α-trifluoropropynyl-18-ethylestradiol 17-acetate, respectively, was obtained.

Example I

To a solution of 1 gram of estrone in 25 cc. of benzene there was added 4 cc. of dihydrofuran. Next, approximately 5 cc. of the mixture of benzene and dihydrofuran was distilled off to remove moisture, and the remaining mixture was then cooled to room temperature. To the cooled mixture there was then added 0.1 gram of p-toluenesulfonic acid, and the resulting reaction mixture was held at room temperature for 3 hours. Following this reaction period the reaction mixture was washed with an aqueous 5% sodium carbonate solution and then with water until neutral, then dried over anhydrous sodium sulfate and evaporated to dryness. The dry residue was then chromatographed by passing it, dissolved in hexane, through a column of neutral alumina, thus giving the 3-tetrahydrofuranyl ether of estrone (3-tetrahydrofuranyloxy-$\Delta^{1,3,5(10)}$-estratrien-17-one).

By repeating this procedure using 18-methylestrone and 18-ethylestrone as the steroid starting materials, 3-tetrahydrofuranyloxy-18-methyl-$\Delta^{1,3,5(10)}$-estratrien-17-one and 3-tetrahydrofuranyloxy-18-ethyl-$\Delta^{1,3,5(10)}$-estratrien-17-one were obtained.

Example II 3-tetrahydrofuranyloxy-$\Delta^{1,3,5(10)}$-estratrien-17-one; 3-tetrahydrofuranyloxy-18-methyl-$\Delta^{1,3,5(10)}$-estratrien-17-one and 3-tetrahydrofuranyloxy-18-ethyl-$\Delta^{1,3,5(10)}$-estratrien-17-one were reduced with sodium borohydride in dioxane in the manner described in Preparation J hereinabove, thus giving 3-tetrahydrofuranyloxy-$\Delta^{1,3,5(10)}$-estratrien-17β-ol, 3-tetrahydrofuranyloxy-18-methyl-$\Delta^{1,3,5(10)}$-estratrien-17β-ol and 3-tetrahydrofuranyloxy-18-ethyl-$\Delta^{1,3,5(10)}$-estratrien-17β-ol, respectively

Example III

The 17-monoacetates prepared as described in Preparation L hereinabove were reacted with dihydrofuran in the manner described in Example I hereinabove, thus giving 17α-methylestradiol 3-tetrahydrofuranyl ether 17-acetate,
17α-vinylestradiol 3-tetrahydrofuranyl ether 17-acetate,
17α-ethynylestradiol 3-tetrahydrofuranyl ether 17-acetate,
17α-fluoroethynylestradiol 3-tetrahydrofuranyl ether 17-acetate,
17α-chloroethynylestradiol 3-tetrahydrofuranyl ether 17-acetate,
17α-bromoethynylestradiol 3-tetrahydrofuranyl ether 17-acetate,
17α-trifluoropropynylestradiol 3-tetrahydrofuranyl ether 17-acetate,
17α,18-dimethylestradiol 3-tetrahydrofurany ether 17-acetate,
17α-vinyl-18-methylestradiol 3-tetrahydrofuranyl ether 17-acetate,
17α-ethynyl-18-methylestradiol 3-tetrahydrofuranyl ether 17-acetate,
17α-fluoroethynyl-18-methylestradiol 3-tetrahydrofuranyl ether 17-acetate,
17α-chloroethynyl-18-methylestradiol 3-tetrahydrofuranyl ether 17-acetate,
17α-bromoethynyl-18-methylestradiol 3-tetrahydrofuranyl ether 17-acetate,
17α-trifluoropropynyl-18-methylestradiol 3-tetrahydrofuranyl ether 17-acetate,
17α-methyl-18-ethylestradiol 3-tetrahydrofuranyl ether 17-acetate,
17α-vinyl-18-estradiol 3-tetrahydrofuranyl ether 17-acetate,
17α-ethynyl-18-ethylestradiol 3-tetrahydrofuranyl ether 17-acetate,
17α-fluoroethynyl-18-ethylestradiol 3-tetrahydrofuranyl ether 17-actate,
17α-chloroethynyl-18-ethylestradiol 3-tetrahydrofuranyl ether 17-acetate,
17α-bromoethynyl-18-ethylestradiol-3-tetrahydrofuranyl ether 17-acetate, and
17α-trifluoropropynyl-18-ethylestradiol 3-tetrahydrofuranyl ether 17-acetate, respectively.

Example IV

A solution of 0.17 gram of potassium hydroxide in 0.2 cc. of water and 2.5 cc. of methanol was added over a 30 minute period to a boiling solution of 1 gram of 3-tetrahydrofuranyloxy-17α-methyl estradiol 17-acetate in 30 cc. of methanol, contained under an inert nitrogen atmosphere. The resulting reaction mixture was then boiled for an additional two hours, after which it was cooled to room temperature, neutralized with acetic acid and concentrated under reduced pressure. Next, water was added to the concentrate, and the resulting precipitate was collected by filtration, washed with water, dried, and then crystallized from acetone-hexane, thus giving 3-tetrahydrofuranyloxy-17α-methyl-$\Delta^{1,3,5,(10)}$-estratrien-17β-ol.

By repeating this procedure using the remaining 3-tetrahydrofuranyloxy-17β-acetoxy steroids prepared as described in Example III hereinabove, the corresponding free 17β-ols were obtained.

Example V

By reacting estradiol 3-acetate, 18-methylestradiol 3-acetate,
18-ethylestradiol 3-acetate,
17α-methylestradiol 3-methyl ether,
17α-vinylestradiol 3-methyl ether,
17α-ethynylestradiol 3-methyl ether,
17α-fluoroethynylestradiol 3-methyl ether,
17α-fluoroethynylestradiol 3-methyl ether,
17α-chloroethynylestradiol 3-methyl ether,
17α-bromoethynylestradiol 3-methyl ether,
17α-trifluoropropynylestradiol 3-methyl ether,
17α-methylestradiol 3-acetate,
17α-vinylestradiol 3-acetate,
17α-ethynylestradiol 3-acetate,
17α-fluoroethynylestradiol 3-acetate,
17α-chloroethynylestradiol 3-acetate,
17α-bromoethynylestradiol 3-acetate,
17α-trifluoropropynylestradiol 3-acetate,
17α,18-dimethylestradiol 3-methyl ether,
17α-vinyl-18-methylestradiol 3-methyl ether,
17α-ethynyl-18-methylestradiol 3-methyl ether,
17α-fluoroethynyl-18-methylestradiol 3-methyl ether,
17α-chloroethynyl-18-methylestradiol 3-methyl ether,
17α-bromoethynyl-18-methylestradiol 3-methyl ether,
17α-trifluoropropynyl-18-methylestradiol 3-methyl ether,
17α,18-dimethylestradiol 3-acetate,
17α-vinyl-18-methylestradiol 3-acetate,
17α-ethynyl-18-methylestradiol 3-acetate,
17α-fluoroethynyl-18-methylestradiol 3-acetate,
17α-chloroethynyl-18-methylestradiol 3-acetate,
17α-bromoethynyl-18-methylestradiol 3-acetate,
17α-trifluoropropynyl-18-methylestradiol 3-acetate,
17α-methyl-18-ethylestradiol 3-methyl ether,
17α-vinyl-18-ethylestradiol 3-methyl ether,
17α-ethynyl-18-ethylestradiol 3-methyl ether,
17α-fluoroethynyl-18-ethylestradiol 3-methyl ether,
17α-chloroethynyl-18-ethylestradiol 3-methyl ether, 17α-bromoethynyl-18-ethylestradiol 3-methyl ether,
17α-trifluoropropynyl-18-ethylestradiol 3-methyl ether,
17α-methyl-18-ethylestradiol 3-acetate,
17α-vinyl-18-ethylestradiol 3-acetate,
17α-ethynyl-18-ethylestradiol 3-acetate,
17α-fluoroethynyl-18-ethylestradiol 3-acetate,
17α-chloroethynyl-18-ethylestradiol 3-acetate,
17α-bromoethynyl-18-ethylestradiol 3-acetate, and
17α-trifluoropropynyl-18-ethylestradiol 3-acetate, respectively, with dihydrofuran in the manner described in Example I hereinabove, the corresponding 17-tetrahydrofuranyl ethers, namely, estradiol 3-acetate 17-tetrahydrofuranyl ether,
18-methylestradiol 3-acetate 17-tetrahydrofuranyl ether,
18-ethylestradiol 3-acetate 17-tetrahydrofuranyl ether,
17α-methylestradiol 3-methyl ether 17-tetrahydrofuranyl ether,
17α-vinylestradiol 3-methyl ether 17-tetrahydrofuranyl ether,
17α-ethynylestradiol 3-methyl ether 17-tetrahydrofuranyl ether,
17α-fluoroethynylestradiol 3-methyl ether 17-tetrahydrofuranyl ether,
17α-chloroethynylestradiol 3-methyl ether 17-tetrahydrofuranyl ether,
17-bromoethynylestradiol 3-methyl ether 17-tetrahydrofuranyl ether,
17α-trifluoropropynylestradiol 3-methyl ether 17-tetrahydrofuranyl ether,
17α-methylestradiol 3-acetate 17-tetrahydrofuranyl ether,
17α-vinylestradiol 3-acetate 17-tetrahydrofuranyl ether,
17α-ethynylestradiol 3-acetate 17-tetrahydrofuranyl ether,
17α-fluoroethynylestradiol 3-acetate 17-tetrahydrofuranyl ether,
17α-chloroethynylestradiol 3-acetate 17-tetrahydrofuranyl ether,
17α-bromoethynylestradiol 3-acetate 17-tetrahydrofuranyl ether,
17α-trifluoropropynylestradiol 3-acetate 17-tetrahydrofuranyl ether,
17α,18-dimethylestradiol 3-methyl ether 17-tetrahydrofuranyl ether,
17α-vinyl-18-methylestradiol 3-methyl ether 17-tetrahydrofuranyl ether,
17α-ethynyl-18-methylestradiol 3-methyl ether 17-tetrahydrofuranyl ether,
17α-fluoroethynyl-18-methylestradiol 3-methyl ether 17-tetrahydrofuranyl ether,
17α-chloroethynyl-18-methylestradiol 3-methyl ether 17-tetrahydrofuranyl ether,
17α-bromoethynyl-18-methylestradiol 3-methyl ether 17-tetrahydrofuranyl ether,
17α-trifluoropropynyl-18-methylestradiol 3-methyl ether 17-tetrahydrofuranyl ether,
17α,18-dimethylestradiol 3-acetate 17-tetrahydrofuranyl ether,
17α-vinyl-18-methylestradiol 3-acetate 17-tetrahydrofuranyl ether,
17α-ethynyl-18-methylestradiol 3-acetate 17-tetrahydrofuranyl ether,
17α-fluoroethynyl-18-methylestradiol 3-acetate 17-tetrahydrofuranyl ether,
17α-chloroethynyl-18-methylestradiol 3-acetate 17-tetrahydrofuranyl ether,
17α-bromoethynyl-18-methylestradiol 3-acetate 17-tetrahydrofuranyl ether,
17α-trifluoropropynyl-18-methylestradiol 3-acetate 17-tetrahydrofuranyl ether,
17α-methyl-18-ethylestradiol 3-methyl ether 17-tetrahydrofuranyl ether,
17α-vinyl-18-ethylestradiol 3-methyl ether 17-tetrahydrofuranyl ether,
17α-ethynyl-18-ethylestradiol 3-methyl ether 17-tetrahydrofuranyl ether,
17α-fluoroethynyl-18-ethylestradiol 3-methyl ether 17-tetrahydrofuranyl ether,
17α-chloroethynyl-18-ethylestradiol 3-methyl ether 17-tetrahydrofuranyl ether,
17α-bromoethynyl-18-ethylestradiol 3-methyl ether 17-tetrahydrofuranyl ether,
17α-trifluoropropynyl-18-ethylestradiol 3-methyl ether 17-tetrahydrofuranyl ether,
17α-methyl-18-ethylestradiol 3-acetate 17-tetrahydrofuranyl ether,
17α-vinyl-18-ethylestradiol 3-acetate 17-tetrahydrofuranyl ether,
17α-ethynyl-18-ethylestradiol 3-acetate 17-tetrahydrofuranyl ether,
17α-fluoroethynyl-18-ethylestradiol 3-acetate 17-tetrahydrofuranyl ether,
17α-chloroethynyl-18-ethylestradiol 3-acetate 17-tetrahydrofuranyl ether,
17α-bromoethynyl-18-ethylestradiol 3-acetate 17-tetrahydrofuranyl ether, and
17α-trifluoropropynyl-18-ethylestradiol 3-acetate 17-tetrahydrofuranyl ether, respectively, were obtained.

*Example VI*

The 3-acetoxy-17-tetrahydrofuranyloxy derivatives prepared as described in Example V hereinabove were selectively hydrolyzed at the 3-position in the manner described in Preparation I hereinabove, thus giving the corresponding free 3-ols, namely, estradiol 17-tetrahydrofuranyl ether,
18-methylestradiol 17-tetrahydrofuranyl ether,
18-ethyl estradiol-17-tetrahydrofuranyl ether,
17α-methylestradiol 17-tetrahydrofuranyl ether,
17α-vinylestradiol 17-tetrahydrofuranyl ether,
17α-ethynylestradiol 17-tetrahydrofuranyl ether,
17α-fluoroethynylestradiol 17-tetrahydrofuranyl ether,
17α-chloroethynylestradiol 17-tetrahydrofuranyl ether,
17α-bromoethynylestradiol 17-tetrahydrofuranyl ether,
17-trifluoropropynylestradiol 17-tetrahydrofuranyl ether,
17α,18-dimethylestradiol-17-tetrahydrofuranyl ether,
17α-vinyl-18-methylestradiol 17-tetrahydrofuranyl ether,
17α-ethynyl-18-methylestradiol 17-tetrahydrofuranyl ether,
17α-fluoroethynyl-18-methylestradiol 17-tetrahydrofuranyl ether,
17α-chloroethynyl-18-methylestradiol 17-tetrahydrofuranyl ether,
17α-bromoethynyl-18-methylestradiol 17-tetrahydrofuranyl ether,
17α-trifluoropropynyl-18-methylestradiol 17-tetrahydrofuranyl ether,
17α-methyl-18-ethylestradiol 17-tetrahydrofuranyl ether,
17α-vinyl-18-ethylestradiol 17-tetrahydrofuranyl ether,
17α-ethynyl-18-ethylestradiol 17-tetrahydrofuranyl ether,
17α-fluoroethynyl-18-ethylestradiol 17-tetrahydrofuranyl ether,
17α-chloroethynyl-18-ethylestradiol 17-tetrahydrofuranyl ether,
17α-bromoethynyl-18-ethylestradiol 17-tetrahydrofuranyl ether, and
17α-trifluoropropynyl-18-ethylestradiol 17-tetrahydrofuranyl ether, respectively.

*Example VII*

By reacting estradiol, 18-methylestradiol,
18-ethylestradiol,
17α-methylestradiol,
17α-vinylestradiol,
17α-ethynylestradiol,
17α-fluoroethynylestradiol,
17α-chloroethynylestradiol, 17α-bromoethynylestradiol,
17α-trifluoropropynylestradiol,
17α,18-dimethylestradiol,
17α-vinyl-18-methylestradiol,
17α-ethynyl-18-methylestradiol,
17α-fluoroethynyl-18-methylestradiol,
17α-chloroethynyl-18-methylestradiol,
17α-bromoethynyl-18-methylestradiol,
17α-trifluoropropynyl-18-methylestradiol,
17α-methyl-18-ethylestradiol,
17α-vinyl-18-ethylestradiol,
17αethynyl-18-ethylestradiol,
17α-fluoroethynyl-18-ethylestradiol,
17α-chloroethynyl-18-ethylestradiol,
17α-bromoethynyl-18-ethylestradiol, and
17α-trifluoropropynyl-18-ethylestradiol, with dihydrofuran in the manner described in Example I hereinabove, the corresponding 3,17-bis-(tetrahydrofuranyl)ethers, namely, estradiol 3,17-bis(tetrahydrofuranyl)ether,
18-methylestradiol 3,17-bis(tetrahydrofuranyl)ether,
18-ethylestradiol 3,17-bis(tetrahydrofuranyl)ether,
17α-methylestradiol 3,17-bis(tetrahydrofuranyl)ether,
17α-vinylestradiol 3,17-bis(tetrahydrofuranyl)ether,
17α-ethynylestradiol 3,17-bis(tetrahydrofuranyl)ether,
17α-fluoroethynylestradiol 3,17-bis(tetrahydrofuranyl) ether,
17α-chloroethynylestradiol 3,17-bis(tetrahydrofuranyl) ether,
17α-bromoethynylestradiol 3,17-bis(tetrahydrofuranyl) ether,
17α-trifluoropropynylestradiol 3,17-bis(tetrahydrofuranyl) ether,
17α,18-dimethylestradiol 3,17-bis(tetrahydrofuranyl) ether,
17α-vinyl-18-methylestradiol 3,17-bis(tetrahydrofuranyl) ether,
17α-ethynyl-18-methylestradiol 3,17-bis(tetrahydrofuranyl)ether,
17α-fluoroethynyl-18-methylestradiol 3,17-bis(tetrahydrofuranyl)ether,
17α-chloroethynyl-18-methylestradiol 3,17-bis(tetrahydrofuranyl)ether,
17α-bromoethynyl-18-methylestradiol 3,17-bis(tetrahydrofuranyl)ether,
17α-trifluoropropynyl-18-methylestradiol-3,17-bis(tetrahydrofuranyl)ether,
17α-methyl-18-ethylestradiol 3,17-bis(tetrahydrofuranyl) ether,
17α-vinyl-18-ethylestradiol 3,17-bis(tetrahydrofuranyl) ether,
17α-ethynyl-18-ethylestradiol 3,17-bis(tetrahydrofuranyl) ether,
17α-fluoroethynyl-18-ethylestradiol 3,17-bis(tetrahydrofuranyl)ether,
17α-chloroethynyl-18-ethylestradiol 3,17-bis(tetrahydrofuranyl)ether,
17α-bromoethynyl-18-ethylestradiol 3,17-bis(tetrahydrofuranyl)ether, and
17α-trifluoropropynyl-18-ethylestradiol 3,17-bis(tetrahydrofuranyl)ether, respectively, were obtained.

It will be obvious to those skilled in the art that other changes can be made in carrying out the present invention without departing from the spirit and scope thereof as defined in the appended claims.

I claim:

1. A compound of the general formula:

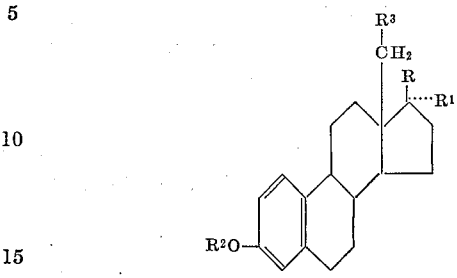

wherein R is selected from the group consisting of a hydroxyl group, an acyloxy group derived from a hydrocarbon carboxylic acid containing less than 12 carbon atoms, and a tetrahydrofuranyloxy group, $R^1$ is selected from the group consisting of hydrogen, a lower alkyl group, a lower alkenyl group and a lower alkynyl group, R and $R^1$ taken together represent a keto group, $R^2$ is selected from the group consisting of hydrogen, an acyl group containing less than 12 carbon atoms, a hydrocarbon group containing from 1 to 8 carbon atoms, inclusive, and a tetrahydrofuranyl group, with at least one of R and $OR^2$ being a tetrahydrofuranyloxy group, and $R^3$ is selected from the group consisting of hydrogen and a lower alkyl group.

2. Estrone 3-tetrahydrofuranyl ether.
3. 18-lower alkyl estrone 3-tetrahydrofuranyl ether.
4. 18-ethylestrone 3-tetrahydrofuranyl ether.
5. Estradiol 3-tetrahydrofuranyl ether.
6. Estradiol 17-tetrahydrofuranyl ether.
7. A tetrahydrofuranyl ether of 18-lower alkyl estradiol.
8. 18-lower alkyl estradiol 3-tetrahydrofuranyl ether.
9. A tetrahydrofuranyl ether of 17α-methylestradiol.
10. 17α-methylestradiol 3-tetrahydrofuranyl ether.
11. A tetrahydrofuranyl ether of 17α-methyl-18-lower alkyl estradiol.
12. 17α-methyl-18-lower alkyl estradiol 3-tetrahydrofuranyl ether.
13. A tetrahydrofuranyl ether of 17α-ethynylestradiol.
14. 17α-ethynylestradiol 3-tetrahydrofuranyl ether.
15. A tetrahydrofuranyl ether of 17α-ethynyl-18-lower alkyl estradiol.
16. 17α-ethynyl-18-lower alkyl estradiol 3-tetrahydrofuranyl ether.
17. A tetrahydrofuranyl ether of 17α-halo-lower alkynyl estradiol wherein the halogen has an atomic number less than 53.
18. 17α-halo-lower alkynyl estradiol 3-tetrahydrofuranyl ether wherein the halogen has an atomic number less than 53.
19. A tetrahydrofuranyl ether of 17α-halo-lower alkynyl-18-lower alkyl estradiol wherein the halogen has an atomic number less than 53.
20. 17α-halo-lower alkynyl-18-lower alkyl estradiol 3-tetrahydrofuranyl ether wherein the halogen has an atomic number less than 53.

No references cited.

LEWIS GOTTS, *Primary Examiner.*

HENRY A. FRENCH, *Assistant Examiner.*